United States Patent [19]

Sutton et al.

[11] Patent Number: 5,298,044
[45] Date of Patent: Mar. 29, 1994

[54] EXTENDED SURFACE POCKET TYPE AIR FILTER

[75] Inventors: Darrel Sutton, Sherwood Park; Michael Benoit; Daniel Gagne, both of Edmonton, all of Canada

[73] Assignee: B.G.E. Service & Supply Ltd., Edmonton, Canada

[21] Appl. No.: 69,374

[22] Filed: Jun. 1, 1993

[51] Int. Cl.⁵ ............................................. B01D 46/02
[52] U.S. Cl. ....................................... 55/378; 55/493; 55/497; 55/499; 55/511; 55/DIG. 12; 55/DIG. 31
[58] Field of Search ................. 55/369, 378, 381, 493, 55/495, 497, 499, 511, 512, DIG. 12, DIG. 31

[56] References Cited

U.S. PATENT DOCUMENTS

| | | |
|---|---|---|
| 2,499,949 | 3/1950 | Glanzer et al. . |
| 3,131,044 | 4/1964 | Springer . |
| 3,190,059 | 6/1965 | Bauder et al. . |
| 3,422,602 | 1/1969 | Janson . |
| 3,620,375 | 11/1971 | Atkins ............................. 55/497 X |
| 3,871,848 | 3/1975 | Smith . |
| 3,997,305 | 12/1976 | Ulvestad et al. . |
| 4,300,927 | 11/1981 | Day ........................ 55/378 |
| 4,312,648 | 1/1982 | Day . |
| 4,356,011 | 10/1982 | Day et al. . |

FOREIGN PATENT DOCUMENTS 1184514  3/1985  Canada .
32580    6/1921  Norway .

OTHER PUBLICATIONS

SnyderGeneral Corporation, Product Brochure, "PURE—Klean Extended Surface Pocket Filters", Apr. 1991, 4 pages.
SnyderGeneral Canada Inc., Product Brochure, "DRI-Pak", Jul. 1991, 8 pages.
AAF-Ltd., DRI-Pak, High and Medium Efficiency Air Filters Extended Surface Pocket Type, Oct. 1981, 8 pages.

Primary Examiner—Charles Hart
Attorney, Agent, or Firm—Anthony R. Lambert

[57] ABSTRACT

An extended pocket type air filter formed of a single rectangular frame enclosing and locking a plurality of parallel header plates each having complementary projections and grooves on opposite edges, the complementary projections of one header fitting into the grooves of an adjacent header and securing pocket type air filter medium between them. A rivet secures ends of the frame to each other about the header plates.

8 Claims, 3 Drawing Sheets

EXTENDED SURFACE POCKET TYPE AIR FILTER

FIELD OF THE INVENTION

This invention relates to air filters, particularly air filters of the pocket type, for use in industrial, commercial and institutional ventilation systems.

BACKGROUND AND SUMMARY OF THE INVENTION

Pocket type air filters for use in industrial, commercial and institutional ventilation air ducts typically have a frame that holds one or more synthetic or natural fibre bags. The frame and bags are oriented in the duct with the openings of the bags open towards the flow of air with the remainder of the bags extending downstream to provide a large surface area filter for use in removing particulates from the air.

In some previous designs, several bags are provided, with each secured to a header, the headers being themselves secured within the frame. The bag material may be glued, riveted, heat sealed, ultrasonically sealed, stapled or the like to the header in a more or less permanent manner.

With these previous designs, there are often numerous components, making construction, maintenance and disposal difficult. Also, with permanent bonding of the bag material to the header, when the bag material is replaced, the header must be replaced as well, thus creating a disposal problem. The present invention is directed towards overcoming these problems.

The invention therefore provides in one aspect a single frame enclosing a plurality of parallel header plates each having complementary projections and grooves on opposite edges, the complementary projections of one header fitting into the grooves of an adjacent header and securing pocket type air filter medium between them. The air filter therefore includes three primary components: frame, header plates and filter medium, therefore allowing ease of assembly, disassembly and disposal, while creating a rigid and secure air filter.

This and other aspects of the invention are described in more detail in the description and claims that follow.

BRIEF DESCRIPTION OF THE DRAWINGS

There will now be described a preferred embodiment of the invention, with reference to the drawings, by way of illustration, in which like numerals denote like elements and in which.

DETAILED DESCRIPTION OF PREFERRED EMBODIMENTS

Figure 5:
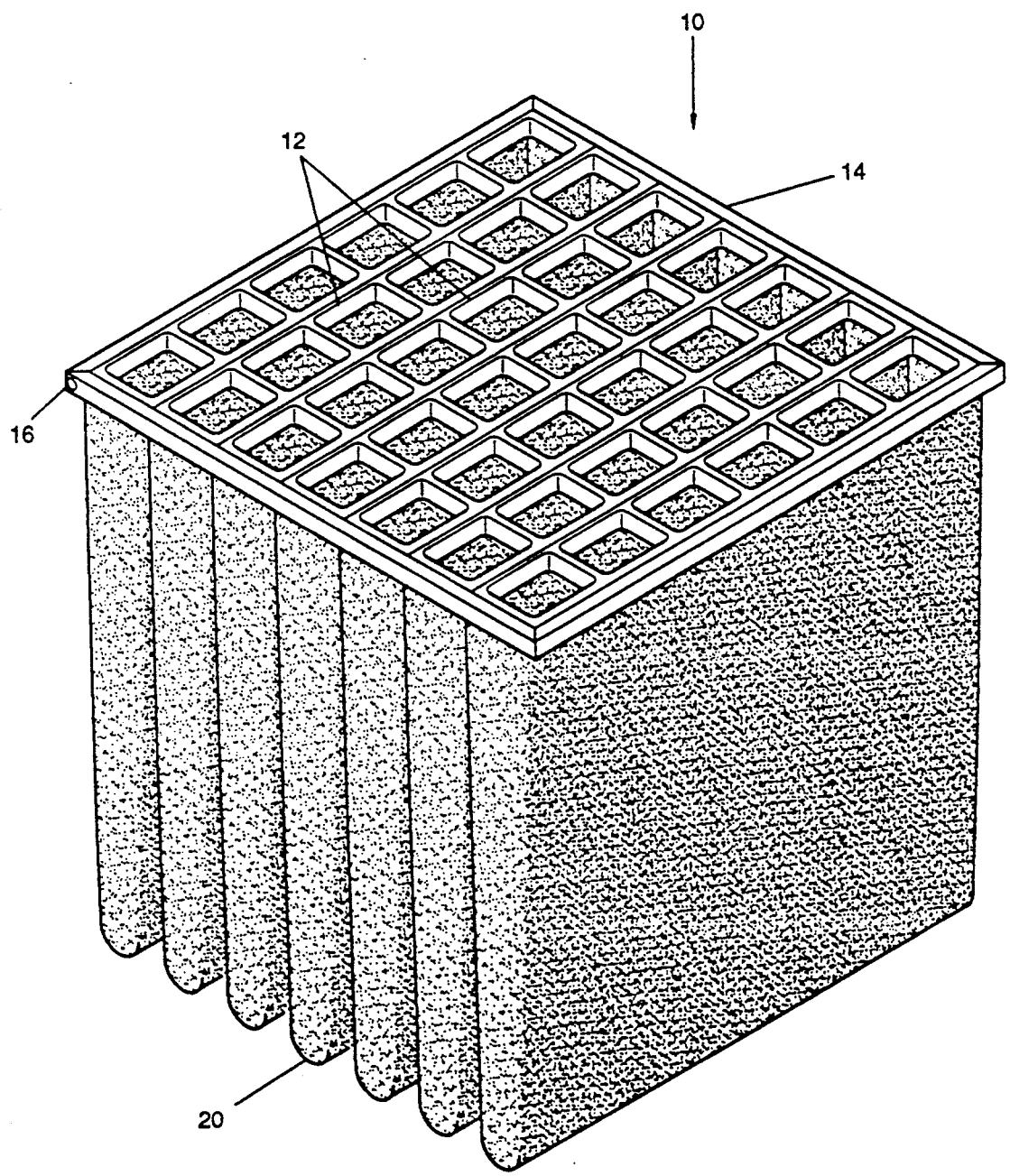
FIG. 5 is a perspective of a complete air filter according to the invention, showing the frame surrounding a set of seven header plates, each interlocking with at least one adjacent header plate in the manner shown in FIG. 4.

Referring to the Figures, there is shown in FIG. 5 an extended surface pocket type air filter 10 formed from a plurality of header plates or panels 12, each header plate 12 lying adjacent at least one other header plate 12 and all of the header plates 12 being enclosed within and bound by frame 14. Frame 14 is formed from a generally rectangular u-shaped channel member having dimensions suitable to enclose and hold the header plates 12, with the interior of the channel opening into the area bound by the frame 14 (where the header plates 12 are located). The frame 14 is locked or fastened about the header plates with a single fastener 16, for example a rivet or other like means, fastened to the ends of the frame 14 where they meet to complete the rectangle. Adjacent header plates 12 secure peripheral edges of pocket type air filter medium 20 between them. The frame 14 may be made of galvanized steel to improve the rigidity of the structure.

As noted, the air filter 10 includes a plurality of headers, whose design and placement relative to each other is shown in FIGS. 1, 2, 3 and 4. Each header plate 12 has the same configuration and is designed to interlock with an adjacent header plate. The header plates 12 are preferably constructed of resilient rigid plastic material such as moulded high temperature polypropylene. Each header plate 12 includes a first rigid side 22, a second rigid side 24 and first and second ends 26 extending between the first and second rigid sides 22, 24 to define a plurality of apertures or portals 30, here shown as six in number, although in principle fewer might suffice in accordance with the principles of the invention. Rigid in this context, with reference to the sides, means sufficiently rigid so that when a set of headers are secured together with a frame 14 bounding them, and pocket type air filter medium 20 is secured between adjacent header plates, the center portions of the sides of the headers do not flex so far that they allow the filter medium 20 to become dislodged from between the headers, and thus allow unfiltered air to pass through the filter.

Figure 2:
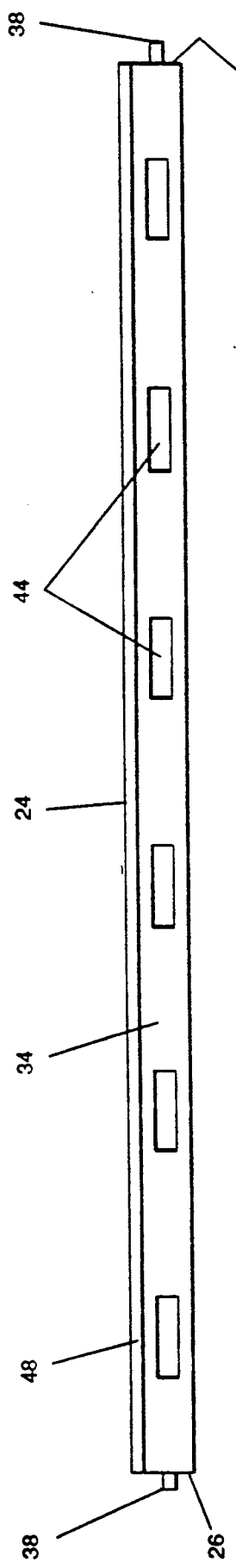
FIG. 2 is a side view of the grooved side of the header plate of FIG. 1.
Figure 3:
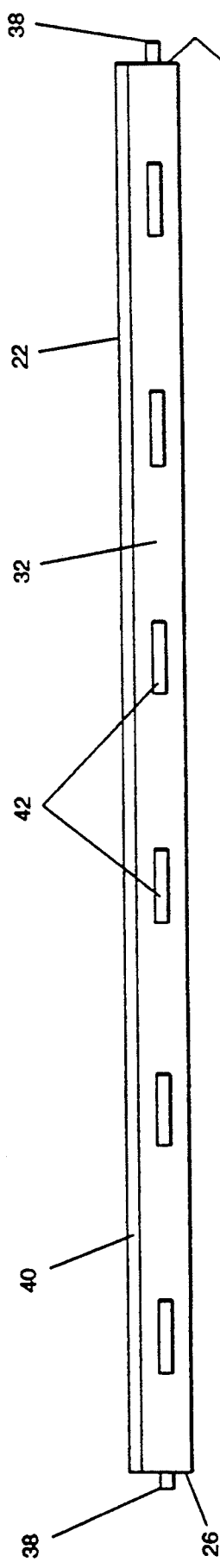
FIG. 3 is a side view of the tongued side of the header plate.

As shown particularly in FIGS. 2 and 3, the first rigid side 22 and the second rigid side 24 of each header plate 12 have first and second exterior edges 32, 34 respectively. The first exterior edge 32 of each header plate 12 includes a set of tongues 42, here shown as six in number, corresponding to the number of portals, and the second exterior edge 34 includes a set of complementary grooves 44 corresponding to the set of tongues 42. Complementary in this context means that the tongue fits snugly in the groove with filter medium between the tongue and groove.

Figure 1:
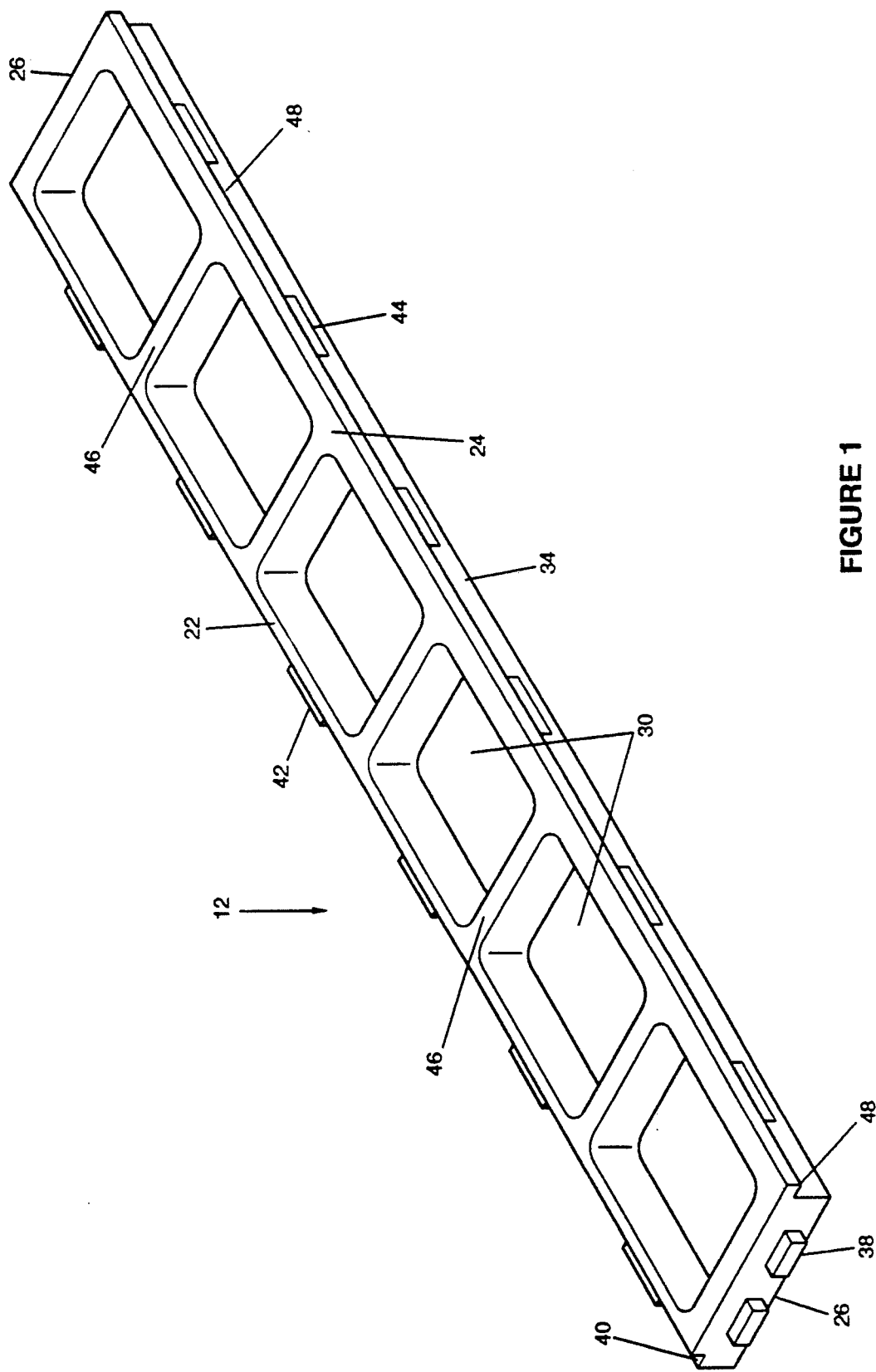
FIG. 1 is a perspective view of a header plate according to the invention, one shorter side of which is grooved and the other shorter side of which is tongued.

As shown in FIG. 1, each header plate 12 includes a plurality of bars 46 extending from the first rigid side 22 to the second rigid side 24 of each header plate, which define a plurality of apertures 30 in each header plate 12. The bars 46 are preferably aerodynamically contoured to reduce air friction, and should be long enough in the direction perpendicular to the normal flow of air through the air filter to deflect at least more than an insignificant amount of air moving at an angle to the normal flow of air. The bars 46, spaced equidistantly along the each header plate 12, serve to deflect air that is not moving in the normal direction of flow and distribute the air across the plate so as to allow the plates to serves as diffusion panels for full utilization of each pocket type air filter. Thus, air coming in at an angle towards the air filter is deflected by the bars 46 so that it is not all forced to one side of the channel in which the air filter is placed. Clearly, the more bars that are used, the more air will be deflected, and the stiffer the plate will be, but an increase in the number of bars tends to restrict air flow. For the preferred material, moulded high temperature polypropylene, it is preferable that the spacing between the bars be more or less comparable to or a little less than the spacing between the edges of the header plate, so that the apertures 30 are rectangular, with an aspect ration of about 4/3. Generally, an aspect ratio of between 1 and 2 would be acceptable (the long dimension of the aperture being parallel to the long dimension of the header plate). However, with the dimensions of the header plate shown (in which seven header plates side by side form a square), the preferred number of apertures is six, while three is too few, and ten too many, for optimal operation.

Each end 26 of each header plate 12 includes at least one tongue 38 and the frame 14 includes a plurality of grooves or a single groove (not shown) extending around the inside of the channel to receive the tongues 38. A longitudinal recess 40 along one side (here shown as side 22) of each header plate 12, with complementary longitudinal projection 48 on the other side (here shown as side 24) assist in holding the header plates 12 together and in aligning them.

Figure 4:
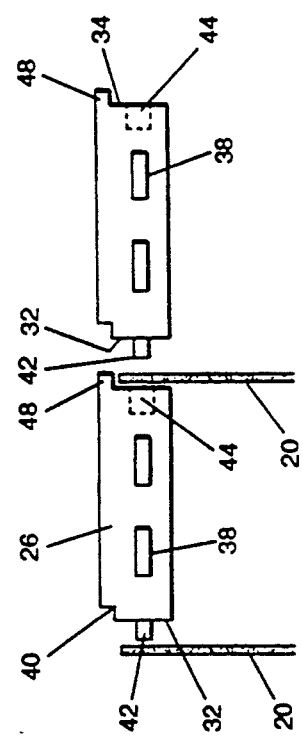
FIG. 4 is an end view of two header plates, as shown in FIGS. 1, 2 and 3 lying adjacent each other for interlocking.

Pocket type air filter medium 20, any of such as are commonly known in the art, is disposed around each header plate 12 and held firmly between adjacent header plates, and between the ends 26 of the header plates 12 and the frame 14, as shown in FIGS. 4 and 5. Preferably the air filter medium 20 is formed from individually stitched and reinforced down fibreglass pockets with tape stitched along the sides to assist in eliminating the risk of shredding of the medium or blowing out of the medium. The tongues or projections 42 fit into the corresponding grooves 44, displacing the pocket medium 20, and creating a tight friction fit between adjacent header plates with little risk of damage to the filter medium during installation. Similarly the pocket medium 20 is fastened between the tongues 38 and the frame 14.

Assembly of the finished air filter is accomplished by initially fitting the open end of pocket medium 12 around the outside of each header plate 12. The header plate 12 is then slid into the frame 14. After installation of several header plates 12 complete with pocket medium, the assembly is fastened together with a pop rivet. When the air filter has been used for some time, for example 12-24 months, it is ready to be recharged. The assembly is fitted into a holding frame (not shown), the single rivet is removed and individual header plates 12 are removed from the frame 14. The used pocket filter medium may be discarded. The header plates 12 may be cleaned and reused or recycled to form new header plates.

Standard nominal size of the air filter is 24×24 inches, header thickness is 13/16" and the pocket type air filters have a standard length of 28", although of course other lengths such as 36" may be used. The filter may be made with various efficiencies such as 65%, 85% or 95%, the latter removing particles down to 0.3 microns, with close to 100% efficiency for particles greater than 1 micron. The rigid design of the filter may also be used to provide supplemental support for a pre-filter. A pre-filter is recommended for removal of fine grained material such as carbon black, fly ash and smoke particles.

ALTERNATIVE EMBODIMENTS

A person skilled in the art could make immaterial modifications to the invention described and claimed in this patent without departing from the essence of the invention.

The embodiments of the invention in which an exclusive property or privilege is claimed are defined as follows:

1. An extended surface pocket type air filter comprising:
   a plurality of header plates, each header plate including a first rigid side, a second rigid side and first and second ends extending between the first and second rigid sides to define at least one interior aperture;
   the first rigid side and the second rigid side of each header plate having first and second exterior edges respectively;
   the first exterior edge of each header plate including a set of tongues;
   the second exterior edge including a set of complementary grooves corresponding to the set of tongues;
   a generally rectangular frame having dimensions suitable to enclose and hold the header plates; and
   means to lock the frame about the header plates.

2. The extended surface pocket type air filter of claim 1 further including a plurality of bars extending from the first rigid side to the second rigid side of each header plate and defining a plurality of apertures in each header plate.

3. The extended surface pocket type air filter of claim 2 in which each aperture has an aspect ratio of between 1 and 2, with the longer dimension being parallel to the long dimension of the header plate.

4. The extended surface pocket type air filter of claim 3 in which each aperture has an aspect ratio of about 4/3.

5. The extended surface pocket type air filter of claim 2 in which each end of each header plate includes a tongue adapted to fit into the frame.

6. The extended surface pocket type air filter of claim 1 further including an air pocket filter medium disposed around each header plate and held firmly between adjacent header plates.

7. The extended surface pocket type air filter of claim 3 further including an air pocket filter medium disposed around each header plate and held firmly between adjacent header plates.

8. The extended surface pocket type air filter of claim 5 further including an air pocket filter medium disposed around each header plate and held firmly between adjacent header plates.

* * * * *